United States Patent
Bergström et al.

(10) Patent No.: US 10,469,213 B2
(45) Date of Patent: Nov. 5, 2019

(54) NETWORK NODE, A WIRELESS DEVICE AND METHODS THEREIN FOR HANDLING AUTOMATIC REPEAT REQUESTS (ARQ) FEEDBACK INFORMATION

(71) Applicant: Telefonaktiebolaget L M Ericsson (publ), Stockholm (SE)

(72) Inventors: Andreas Bergström, Vikingstad (SE); Håkan Andersson, Linköping (SE); Johan Furuskog, Stockholm (SE); Niclas Wiberg, Linköping (SE); Qiang Zhang, Täby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 858 days.

(21) Appl. No.: 14/440,537

(22) PCT Filed: Jan. 21, 2015

(86) PCT No.: PCT/SE2015/050052
§ 371 (c)(1),
(2) Date: May 4, 2015

(87) PCT Pub. No.: WO2016/118054
PCT Pub. Date: Jul. 28, 2016

(65) Prior Publication Data
US 2016/0344517 A1   Nov. 24, 2016

(51) Int. Cl.
*H04L 1/18* (2006.01)
*H04L 1/16* (2006.01)
(Continued)

(52) U.S. Cl.
CPC .......... *H04L 1/1887* (2013.01); *H04L 1/1678* (2013.01); *H04L 1/1685* (2013.01);
(Continued)

(58) Field of Classification Search
CPC ............... H04W 52/362; H04W 52/60; H04W 72/0413; H04W 72/048; H04W 72/1226
(Continued)

(56) References Cited

U.S. PATENT DOCUMENTS 7,000,021 B1 *  2/2006  Radhakrishnan ..... H04L 1/1614
                                                         370/394
2004/0042492 A1   3/2004  Suzuki et al.
(Continued)

FOREIGN PATENT DOCUMENTS

JP   2003179581 A    6/2003
RU   2497287 C2    10/2013
(Continued)

*Primary Examiner* — Natasha W Cosme
(74) *Attorney, Agent, or Firm* — Murphy, Bilak & Homiller, PLLC

(57) ABSTRACT

Embodiments herein relate to a method performed by a network node (110) in a wireless communications network (100) for handling Automatic Repeat reQuest, ARQ, feedback information from a wireless device (121) relating to downlink transmissions from the network node (110). The network node (110) obtains an indication of a downlink processing delay for the ARQ feedback information from the wireless device (121). Then, the network node (110) considers the ARQ feedback information relating to a downlink transmission from the wireless device (121) to be invalid when, according to the obtained indication of a downlink processing delay, the downlink transmission has not been processed by the wireless device (121). Embodiments of the network node (110) are also described.

Furthermore, embodiments herein further relate to a wireless device (110) and method therein for enabling a network node (110) in a wireless communications network (100) to handle Automatic Repeat reQuest, ARQ, feedback information from the wireless device (121) relating to downlink transmissions from the network node (110).

13 Claims, 4 Drawing Sheets

(51) Int. Cl.
*H04W 72/04* (2009.01)
*H04W 72/12* (2009.01)

(52) U.S. Cl.
CPC ......... *H04L 1/1877* (2013.01); *H04W 72/048* (2013.01); *H04W 72/0413* (2013.01); *H04W 72/1226* (2013.01)

(58) Field of Classification Search
USPC .......................................................... 370/336
See application file for complete search history.

(56) References Cited

U.S. PATENT DOCUMENTS

| | | | |
|---|---|---|---|
| 2007/0133475 A1 | 6/2007 | Peisa | |
| 2010/0095183 A1 | 4/2010 | Petrovic et al. | |
| 2011/0029881 A1* | 2/2011 | Smith | G06F 8/60 715/735 |
| 2013/0142268 A1* | 6/2013 | Gao | H04W 76/14 375/252 |

FOREIGN PATENT DOCUMENTS

| | | |
|---|---|---|
| WO | 2008135238 A1 | 11/2008 |
| WO | 2010/021498 A2 | 2/2010 |

\* cited by examiner

NETWORK NODE, A WIRELESS DEVICE AND METHODS THEREIN FOR HANDLING AUTOMATIC REPEAT REQUESTS (ARQ) FEEDBACK INFORMATION

TECHNICAL FIELD

Embodiments herein relate to Automatic Repeat reQuest, ARQ, feedback information in a wireless communications network. In particular, embodiments herein relate to a network node in a wireless communications network and method therein for handling ARQ feedback information from a wireless device relating to downlink transmissions from the network node. Furthermore, embodiments herein particularly relate to a wireless device and method therein for enabling a network node in a wireless communications network to handle ARQ feedback information from the wireless device relating to downlink transmissions from the network node.

BACKGROUND

In a typical wireless or radio communications network, wireless devices, also known as mobile stations, terminals, and/or User Equipment, UEs, communicate via a Radio-Access Network, RAN, with one or more core networks. The RAN covers a geographical area which is divided into cell areas, with each cell area being served by a base station, e.g. a radio base station, RBS, or network node, which in some networks may also be called, for example, a "NodeB", "eNodeB" or "eNB". A cell is a geographical area where radio coverage is provided by the radio base station at a base station site or an antenna site in case the antenna and the radio base station are not collocated. Each cell is identified by an identity within the local radio area, which is broadcast in the cell. Another identity identifying the cell uniquely in the whole mobile network is also broadcasted in the cell. One radio base station may have one or more cells. The base stations communicate over the air interface operating on radio frequencies with the user equipment within range of the base stations.

A Universal Mobile Telecommunications System, UMTS, is a third generation mobile communication system, which evolved from the second generation, 2G, Global System for Mobile Communications, GSM. The UMTS terrestrial radio-access network, UTRAN, is essentially a RAN using wideband code-division multiple access, WCDMA, and/or High-Speed Packet Access, HSPA, to communicate with user equipment. In a forum known as the Third Generation Partnership Project, 3GPP, telecommunications suppliers propose and agree upon standards for third generation networks and UTRAN specifically, and investigate enhanced data rate and radio capacity. In some versions of the RAN, as e.g. in UMTS, several base stations may be connected, e.g., by landlines or microwave, to a controller node, such as a radio network controller, RNC, or a base station controller, BSC, which supervises and coordinates various activities of the plural base stations connected thereto. The RNCs are typically connected to one or more core networks.

Specifications for the Evolved Packet System, EPS, have been completed within the $3^{rd}$ Generation Partnership Project, 3GPP, and this work continues in the coming 3GPP releases. The EPS comprises the Evolved Universal Terrestrial Radio-Access Network, E-UTRAN, also known as the Long-Term Evolution, LTE, radio access, and the Evolved Packet Core, EPC, also known as System Architecture Evolution, SAE, core network. E-UTRAN/LTE is a variant of a 3GPP radio-access technology wherein the radio base station nodes are directly connected to the EPC core network rather than to RNCs. In general, in E-UTRAN/LTE the functions of a RNC are distributed between the radio base station nodes, e.g. eNodeBs in LTE, and the core network. As such, the Radio-Access Network, RAN, of an EPS has an essentially "flat" architecture comprising radio base station nodes without reporting to RNCs.

ARQ—Transmissions and Feedback

One approach to handling transmission errors in a wireless communications network is Automatic Repeat reQuest, ARQ. A wireless device using ARQ will detect if a received data packet is in error or not. If not, the wireless device declares the received data error-free and notifies the network node by sending a positive acknowledgement, ACK. If an error was detected, the wireless device may discard the received data and notify the network node by sending a negative acknowledgement, NACK or NAK. In response to a NAK, the network node may retransmit the same information to the wireless device.

Today, in many wireless communication networks, a combination of forward error-correcting coding and ARQ is used. This is commonly referred to as Hybrid ARQ. Hereinafter, when referring to the term ARQ also HARQ is to be considered referred to.

The received data from a given downlink, DL, transmission and any potential retransmissions of the same data may be said to form or constitute an ARQ process. Each reception of a (re)transmission of this data generates an ACK/NACK message that is also said to belong to this ARQ process. It is important that a given ACK/NACK is associated with the correct ARQ process at the transmitting side as well, such that the correct data is retransmitted, i.e. in case of NACK, or new data may be associated with this ARQ process, i.e. in case of ACK.

For DL ARQ transmissions in LTE today, ARQ feedback, i.e. ACK/NAKs, is sent from the wireless device to the network node on either Physical Uplink Control Channel, PUCCH, or Physical Uplink Shared Channel, PUSCH, depending on whether the wireless device has been scheduled for uplink PUSCH transmission or not.

For a wireless communication network using Frequency-Division Duplex, FDD, the transmitted ARQ feedback from one downlink, DL, transmission is received by the network node in the uplink, UL, at a point in time sufficiently long after the corresponding downlink transmission to the wireless device. In the case of LTE, the timing of the transmitted ARQ feedback is such that the feedback from one DL transmission is received by the network node in the UL in subframe n+4 if the corresponding DL transmission to the wireless device was in subframe n. This corresponds to a delay of 4 ms in total. This also sets the total time budget available for the combined propagation delay in DL and UL (which may be up to 0.67 ms and is accounted for in the timing-advance procedure), together with the DL and UL processing delay in the wireless device.

For a wireless communication network using Time-Division Duplex, TDD, the delay from DL data transmission to UL feedback reception may be larger than for FDD, which in the case of LTE means larger than n+4, in order to cater for the half-duplex DL-UL split. This may also cause feedback from more than one reception-time instant or ARQ process to be transmitted at the same time. However, regardless of whether the wireless communication network uses FDD or TDD, the network node may still act in a predictable manner, i.e. the delay from DL transmission to ARQ feedback reception is fixed and determined in standard specifications.

It may here also be noted that in a wireless communication network using dynamic TDD, an asynchronous ARQ protocol with on-demand ARQ feedback may be needed. In this case, the delay from DL transmission to ARQ feedback reception is not necessarily fixed and determined by the specifications, but instead given by the timings of an ARQ request and corresponding feedback.

Downlink Decoding Delay in the UE

As indicated above, the allowed total processing delay in a wireless device is fixed and determined for a certain uplink timing advance as defined by the standard specifications. This means that the processing delay in the wireless device from the determination of the ARQ feedback information pertaining to a downlink reception and up until the determined ARQ feedback information is transmitted is determined and fixed from a network point of view. In some sense, this reflects a "worst-case" scenario with respect to the decoding delay of the downlink in the wireless device. In many cases, however, this delay could be much smaller than the 4 subframes a 1 ms which some wireless communications networks are configured for today.

SUMMARY

It is an object of embodiments herein to improve the handling of ARQ feedback information in a wireless communications network.

According to a first aspect of embodiments herein, the object is achieved by a method performed by a network node in a wireless communications network for handling Automatic Repeat reQuest, ARQ, feedback information from a wireless device relating to downlink transmissions from the network node. The network node obtains an indication of a downlink processing delay for the ARQ feedback information from the wireless device. Then, the network node considers the ARQ feedback information relating to a downlink transmission from the wireless device to be invalid when, according to the obtained indication of a downlink processing delay, the downlink transmission has not been processed by the wireless device.

According to a second aspect of embodiments herein, the object is achieved by a network node in a wireless communications network for handling ARQ feedback information from a wireless device relating to downlink transmissions from the network node. The network node comprises a processor configured to obtain an indication of a downlink processing delay for the ARQ feedback information from the wireless device, and to consider the ARQ feedback information relating to a downlink transmission from the wireless device to be invalid when, according to the obtained indication of a downlink processing delay, the downlink transmission has not been processed by the wireless device.

According to a third aspect of embodiments herein, the object is achieved by a method performed by a wireless device for enabling a network node in a wireless communications network to handle ARQ feedback information from the wireless device relating to downlink transmissions from the network node. The wireless device determines downlink processing delay for the ARQ feedback information. Also, the wireless device transmits an indication of the determined downlink processing delay to the network node.

According to a fourth aspect of embodiments herein, the object is achieved by a wireless device for enabling a network node in a wireless communications network to handle ARQ feedback information from the wireless device relating to downlink transmissions from the network node. The wireless device comprises a processor configured to determine a downlink processing delay for the ARQ feedback information, and a transmitter configured to transmit an indication of the determined downlink processing delay to the network node.

According to a fifth aspect of embodiments herein, the object is achieved by a computer program, comprising instructions which, when executed on at least one processor, cause the at least one processor to carry out the method described above. According to a sixth aspect of embodiments herein, the object is achieved by a carrier containing the computer program described above, wherein the carrier is one of an electronic signal, optical signal, radio signal, or computer readable storage medium.

By obtaining an indication of a downlink processing delay of a wireless device and using said indication to determine the validity of ARQ feedback information received from the wireless device, the network node may reduce delays in the wireless communication network caused by ARQ feedback procedures, while still ensuring the timing validity of the received ARQ feedback information. Hence, the handling of ARQ feedback information in a wireless communications network is improved.

BRIEF DESCRIPTION OF THE DRAWINGS

Features and advantages of the embodiments will become readily apparent to those skilled in the art by the following detailed description of exemplary embodiments thereof with reference to the accompanying drawings, wherein.

DETAILED DESCRIPTION

Figure 1:
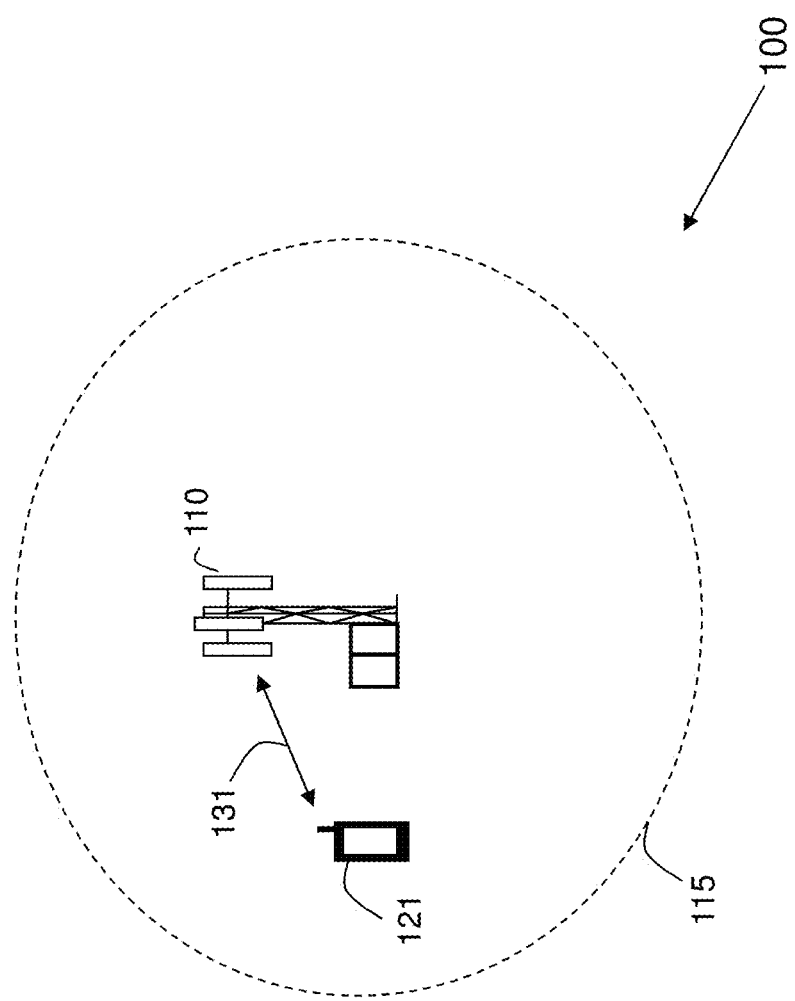
FIG. 1 is a schematic block diagram illustrating embodiments of a network node and a wireless device in a wireless communications network.

The figures are schematic and simplified for clarity, and they merely show details which are essential to the understanding of the embodiments presented herein, while other details have been left out. Throughout, the same reference numerals are used for identical or corresponding parts or steps.

FIG. 1 shows an example of a wireless communications network 100 in which embodiments herein may be implemented. Although illustrated in FIG. 1 as an LTE network, the wireless communications network 100 may be any wireless or radio communication system, such as, LTE-Advanced, Wideband Code-Division Multiple Access (WCDMA), Global System for Mobile communications/Enhanced Data rate for GSM Evolution (GSM/EDGE), Worldwide Interoperability for Microwave Access (Wi-Max), Ultra Mobile Broadband (UMB) or GSM network, or other 3GPP cellular network or system. The wireless communications system 100 comprises the network node 110.

The network node 110 may e.g. be an eNB, eNodeB, or a Home Node B, a Home eNode B, femto Base Station (BS), pico BS or any other network unit capable to serve a wireless device in the wireless communications system 100. The network node 110 may also be e.g. a radio base station, a base station controller, a network controller, a relay node, a repeater, an access point, a radio-access point, a Remote Radio Unit (RRU) or a Remote Radio Head (RRH). Furthermore, the network node 110 comprises one or more antennas for wireless radio communication with wireless devices located within their coverage range; that is, the network node 110 may use one or more of its antennas to provide radio coverage within its cell 115.

A wireless device 121 is located within the cell 115. The wireless device 121 is configured to communicate within the wireless communications network 100 via the etwork node 110 over a radio link 131 when present in the cell 101 served by the network node 110. The wireless devices 121, 122 may e.g. be any kind of wireless device such as a mobile phone, a cellular phone, a Personal Digital Assistant (PDA), a smart phone, a tablet, a sensor equipped with a wireless device, Laptop-Mounted Equipment (LME), Laptop-Embedded Equipment (LEE), Machine-Type-Communication (MTC) device, a wireless device with D2D capability, Customer-Premises Equipment (CPE), etc. Furthermore, although embodiments below are described with reference to the scenario of FIG. 1, this scenario should not be construed as limiting to the embodiments herein, but merely as an example made for illustrative purposes.

As part of developing the embodiments herein, it has been noticed that the actual decoding time, and thus the processing delay, for a wireless device will depend on a number of different aspects, such as, for example, the processing load of the decoding chipset in the wireless device, the Modulation and Coding Scheme, MCS, that is used, whether or not spatial multiplexing is utilized, what level of interference suppression that is needed, etc. This may change quite rapidly and dynamically during session durations of individual wireless devices—sometimes even on a subframe or Transmission-Time Interval, TTI, basis. In most cases, the processing delay for a wireless device may safely be assumed to be much smaller than the 4 ms allowed for in standard specifications. As a comparison, one may consider e.g. the standard specification IEEE 802.1ac, for which the corresponding response time is around 10 µs. Thus, the 4 ms "worst-case" scenario solution used today provides a rather inflexible solution since it does not take into account the actual variations in the decoding.

Furthermore, in future developments of wireless communication, it may be envisioned that the delay requirements may become very strict, i.e. lower than 4 ms. It may even be as low as 1 ms Round-Trip Time, RTT, or less for end-to-end in the user plane. Hence, having an ARQ feedback delay that is unnecessarily large, such as, for example, a "worst-case" scenario as described above, will consume a significant portion of the total allowed processing delay for a wireless device in the wireless communications network. If further assuming subframes which may be shorter than the 1 ms subframes used today, the delay requirements on sending ARQ feedback may be even stricter, such as, e.g. 0.4 ms rather than 4 ms.

It should also be noted that in contrast, there may also be cases in which it may be of interest to relax the decoding delay requirement. This may, for example, be the case hen the wireless device is a low-end or low-cost MTC device.

Figure 2:
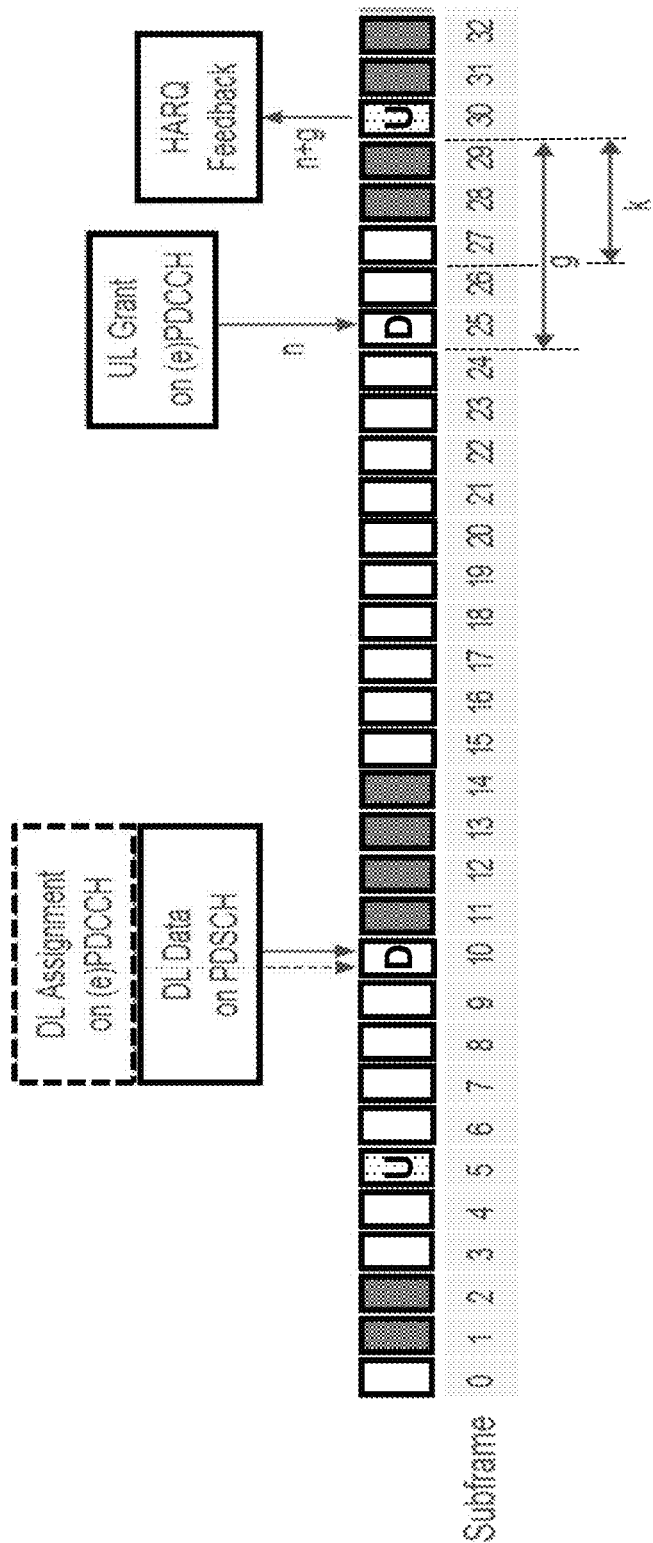
FIG. 2 is a schematic illustration depicting an example of an ARQ feedback procedure for an ARQ process.

FIG. 2 shows a schematic illustration depicting an example of an ARQ feedback procedure for an ARQ process. For the sake of illustration the wireless communication network is here assumed to operate in a dynamic TDD mode in a downlink-centric scenario. Here, the unmarked subframes correspond to downlink, DL, subframes, the dotted subframes correspond to uplink, UL, subframes, and the grid-marked subframes correspond to not scheduled subframes.

In FIG. 2, a reception of a DL Assignment and DL Data is received in subframe 10. Further DL Data for DL transmissions is received in subframes 0, 3-4, 6-9, and 15-27. An UL Grant is received in subframe n=25, whereby the ARQ feedback information is transmitted on the UL in subframe 30, i.e. n+g. Here, the delay between the reception of the UL grant in subframe 25 and the UL transmission of subframe 30 comprising the ARQ feedback is denoted by g, and the downlink processing delay for the wireless device 121 is denoted by k. In this case, while the delay g affects the ARQ transmission, it is not a property of the ARQ but rather of UL scheduling/transmission in general.

In this illustrative example, the ARQ feedback information, i.e. ACK/NAKs, transmitted during subframe n+g may be expected to reflect the correct state of the ARQ reception processes pertaining to DL transmissions having been received by the wireless device 121 up to and including subframe n+g−k. Hence, any DL transmissions occurring after subframe n+g−k cannot be included in the ARQ feedback information because these DL transmission results were not available at the time of assembly for this UL subframe, i.e. subframe n+g.

Furthermore, for any DL transmissions occurring after subframe n+g−k, there may also be old or outdated ARQ feedback information or statuses pertaining to the ARQ processes present in the ARQ feedback information that is transmitted in the UL transmission in subframe n+g, i.e. subframe 30. This is because the wireless device 121 may have received DL transmissions for these ARQ processes at an earlier stage and these ACK/NACKs are still the most recent available ARQ feedback information to the wireless device 121 for these ARQ processes. Thus, since the network node 110 does not know what k is for the wireless device, the network node 110 is not able to determine whether the ARQ feedback information is very old, or out-dated, or relating to a DL transmission that the network node 110 has already sent, but which arrived too late for the corresponding ACK/NACKs to be included in the UL transmission.

This may result in that there will be unnecessary retransmissions from the network node 110 if, e.g. old NACKs are reported but the actual transmission is really received without errors. Another issue is that there will also be ACKs of data from the wireless device 121 to the network node 110 for data that have been received in error. These errors may propagate up to higher layers and cause much longer retransmission times before they get corrected.

In accordance with embodiments described herein, these issues are addressed by obtaining an indication of a downlink processing delay of the wireless device 121 and using said indication to determine the validity of ARQ feedback information received from the wireless device. In this way, the network node 110 may reduce delays in the wireless communication network 100 caused by ARQ feedback procedures, while still ensuring the timing validity of the received ARQ feedback information. Hence, the handling of ARQ feedback information in a wireless communications network 100 is improved.

Figure 3:
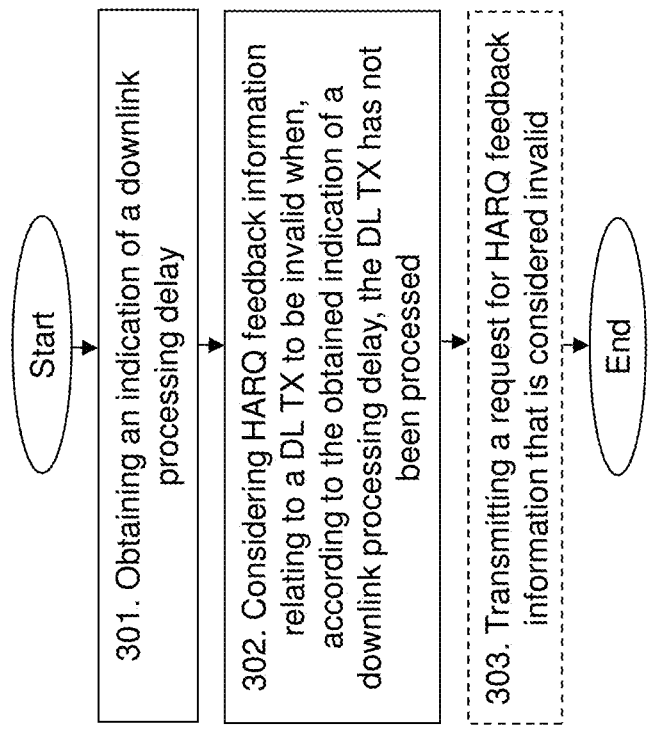
FIG. 3 is a flowchart depicting embodiments of a method in a network node.

Example of embodiments of a method performed by a network node 110 in a wireless communications network 100 for handling Automatic Repeat reQuest, ARQ, feedback information from a wireless device 121 relating to downlink transmissions from the network node 110, will now be described with reference to the flowchart depicted in FIG. 3. FIG. 3 illustrates an example of actions or operations which may be taken by the network node 110. The method may comprise the following actions.

Action 301

The network node 110 obtains an indication of a downlink processing delay for the ARQ feedback information from the wireless device 121. By obtaining the indication of the downlink processing delay, the network node 110 obtains information about the latest time for which receptions of downlink transmissions are reported.

In some embodiments, the indication of the downlink processing delay may be received in one of: an ARQ feedback message, a Radio-Resource Control, RRC, signaling message, or a Medium-Access Control, MAC, signaling message. This means that the network node 110 may receive reports from the wireless device 121 on its downlink processing delay in, for example, each ARQ feedback message or more infrequently by using higher-layer signaling, e.g. RRC or MAC signaling.

Alternatively, in some embodiments, the network node 110 may determine the indication of the downlink processing delay based on information indicating the processing capability of the wireless device 121. This information may, for example, be stored in, or be accessible and retrievable by, the network node 110. In other words, this means that the network node 110 may determine the downlink decoding delay based on a priori knowledge of the wireless device 121. The information indicating the processing capability of the wireless device 121 may, for example, be information on the particular device model of the wireless device 121, such as, e.g. an IMEI number, in combination with a corresponding suitable information storage or database for such capability information inside or outside of the operator's network. Here, for example, a set of different downlink decoding delays may be provided, e.g. corresponding to different device models, in order cater to different scenarios.

Action 302

After obtaining of the indication in Action 301, the network node 110 considers the ARQ feedback information relating to a downlink transmission from the wireless device 121 to be invalid when, according to the obtained indication of a downlink processing delay, the downlink transmission has not been processed by the wireless device 121. This means that the network node 110, for example, when processing an ARQ feedback message or a higher-layer signaling message from the wireless device 121, may use the obtained indication informing about the latest time for which receptions of downlink transmissions are reported in order to determine for which downlink transmissions an ARQ feedback message has up-to-date information and for which downlink transmissions an ARQ feedback message does not have up-to-date information.

Hence, this allows the network node 110 to ignore ARQ feedback information in an ARQ feedback message which relates to the status of ARQ processes for which the latest downlink transmission has not yet with certainty been decoded, and hence, cannot be fully trusted as being up-to-date. As an example, the network node 110 may refrain from performing retransmissions of the DL transmissions in subframes for which the network node 110 has indeed received ARQ feedback information. This is because the network node 110 is now aware of the downlink processing delay of the wireless device 121 and thereby the network node 110 may determine that some of the received ARQ feedback information is irrelevant since it does not reflect the result of the most recent DL transmission.

Advantageously, since the network node 110 is made aware of which received ACK/NACKs are outdated, i.e. by being informed of the downlink processing delay in the wireless device 121, the network node 110 is able to reduce the delay of transmitting new relevant ARQ feedback information by requesting new ARQ feedback information as soon as possible; this, whilst still ensuring the timing validity of the provided ARQ feedback information.

Knowledge of the downlink processing delay also enables the network node 110 to be adapted in view of a specific service or mode of operation in the wireless communication network 100, for example, in case the downlink processing delay does not support a service or mode which requires a fast turn-around time for ARQ feedback information, the service or mode may not be offered by the network node 110. In some embodiments, the ARQ feedback information may be explicitly requested by the network node 110.

Furthermore, by being aware of the downlink processing delay, the network node 110 is also able to improve the performance of different Radio-Resource Management, RRM, functionalities in the network node 110 which may use the ARQ feedback information as an input. One example of such RRM functionalities are Link Adaptation, LA, algorithms in the network node 110. For example, by having a better understanding of which ACK/NACKs are relevant and which are outdated, via the downlink processing delay, the network node 110 may be provided with a link adaptation input of higher quality, and hence, the channel coding in the network node 110 may match the channel conditions in a better way than previously.

Furthermore, for the user-plane, this will be noticed as the RTT being the shortest possible given the above restrictions of minimal ARQ feedback delay and ensured timing validity. It should here also be noted that while the network node 110 may keep the RTT as low as possible when the wireless device 121 is a highly capable, high-end wireless device, the network node 110 may also allow a larger RTT when relaxed delay requirements apply, i.e. when larger processing delays may be allowed, such as, when the wireless device 121 is a low-end wireless device with limited capabilities, e.g. a MTC device.

Also, in some embodiments, the network node 110 may further determine an expected time to receive ARQ feedback information from the wireless device 121 at least partly based on the indication of the downlink processing delay. For example, the network node 110 may use the indication of the downlink processing delay to determine in which subframes it is to expect the ARQ feedback information, i.e. ACK/NAKs in an ARQ feedback message. This may occur on the Physical Uplink Control CHannel, PUCCH, or on the Physical Uplink Shared CHannel, PUSCH, depending on whether the wireless device 121 is scheduled for UL transmissions or not. Advantageously, this may save processing resources in the network node 110 since the network node 110 may be configured so that it does not have to decode ARQ feedback information in every subframe.

Further, in some embodiments, the network node 110 may also schedule uplink transmissions of the wireless device 121 to match an expected time to receive ARQ feedback information from the wireless device 121 at least partly based on the indication of the downlink processing delay. In this case, the network node 110 may advantageously control the UL transmissions of the wireless device 121 to match the time when the ARQ feedback information is to be sent from the wireless device 121 to the network node 110. This may be used by the network node 110, for example, to make the UL/DL usage in a dynamic TDD system more efficient.

Action 303

Optionally, the network node 110 may transmit a request for retransmission of the ARQ feedback information that is considered invalid in Action 302. This allows the network node 110 to request updated ARQ feedback information for the ARQ feedback information that was deemed outdated.

Figure 4:
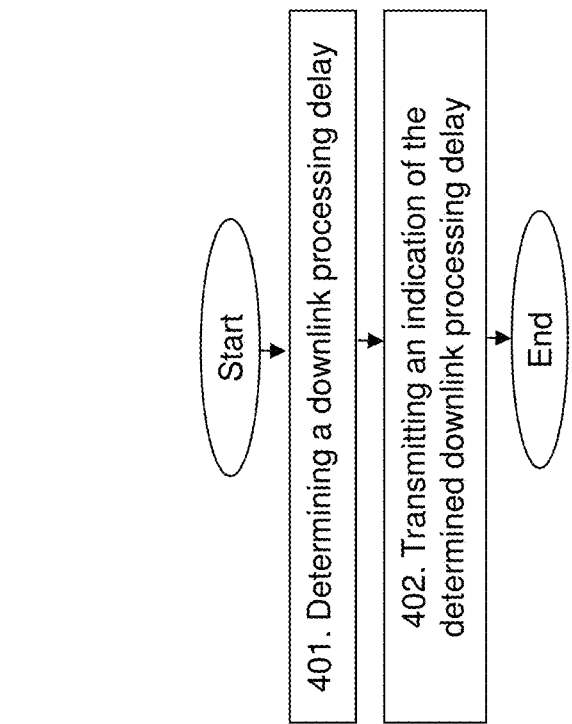
FIG. 4 is a flowchart depicting embodiments of a method in a wireless device.

Example of embodiments of a method performed by a wireless device 121 for enabling a network node 110 in a wireless communications network 100 to handle ARQ feedback information from the wireless device 121 relating to downlink transmissions from the network node 110, will now be described with reference to the flowchart depicted in FIG. 4. FIG. 4 is an illustrated example of actions or operations which may be taken by the wireless device 121. The method may comprise the following actions.

Action 401

The wireless device 121 determines a downlink processing delay for the ARQ feedback information. The downlink processing delay should reflect the processing delay in the wireless device 121 from the determination of the ARQ feedback information pertaining to a downlink transmission reception and up until the determined ARQ feedback information is transmitted.

In some embodiments, the downlink processing delay is determined by a predetermined value in the wireless device 121, and/or a value from a set of redetermined values in the wireless device 121. This means that the downlink processing delay may be determined, or pre-determined/pre-configured, in the wireless device 121. Alternatively, or additionally, a set of different values for the downlink processing delay may be provided in the wireless device 121 in order to best serve or cater to different scenarios. For example, the downlink processing delay during reception on one downlink transmission layer may be equal to $k_1$, whereas during reception on two downlink transmission layers it is $k_2$, wherein $k_1 \neq k_2$.

Optionally, in some embodiments, the wireless device 121 may determine the downlink processing delay based on at least one time period between a determination of ARQ feedback information relating to a downlink transmission and the transmission of the determined ARQ feedback information to the network node 110 from the wireless device 121. This means that the wireless device 121 may estimate the downlink processing delay based on an actual decoding time that the wireless device 121 encountered during a reception of a DL transmission. For example, the downlink processing delay may be directly obtained based on the latest finalized decoding attempt ready to be reported.

In this case, in some embodiments, the downlink processing delay may be determined by the wireless device 121 by more than one such time period. This means that the wireless device 121 may estimate the downlink processing delay based on several actual decoding times that the wireless device 121 has encountered during receptions of DL transmissions. Here, the wireless device 121 may, for example, determine an upper-bound for a typical delay, a median value, or an average value based on the several actual decoding times.

In some embodiments, the wireless device 121 may determine the downlink processing delay based on a configurable amount of resources in the wireless device 121 dedicated for downlink processing. This means that the wireless device 121 may, for example, dynamically change the processing power used by the wireless device 121 to decode the DL data of the DL transmissions. In this case, different values of the downlink processing delay may be used. For example, when a real-time online game application is running and operated in the wireless device 121, the wireless device 121 may use the full processing power in order to achieve a minimum downlink processing delay. On the other hand, according to another example, when a messaging and chat application is running and operated in the wireless device 121, or the power saving mode is set in the wireless device 121, the downlink processing delay may be relaxed and the wireless device 121 may only use a small part of the processing power, i.e. having larger processing delays.

Action 402

After the determination in Action 401, the wireless device 121 transmits an indication of the determined downlink processing delay to the network node 110. This means that the wireless device 121 may include the indication of the determined downlink processing delay, i.e. information about the latest time for which receptions of downlink transmissions are reported, when sending, for example, an ARQ feedback message or a higher-layer signaling message to the network node 110. By including the indication, the wireless device 121 enables the network node 110 to determine, e.g. when processing the ARQ feedback message or the higher-layer signaling message, for which downlink transmissions the ARQ feedback information in the ARQ feedback message has up-to-date information and for which downlink transmissions the ARQ feedback information in the ARQ feedback message does not have up-to-date information.

According to some embodiments, the wireless device 121 may transmit the indication of the determined downlink processing delay in one of: an ARQ feedback message, a RRC signaling message, or a MAC signaling message. This means that the wireless device 121 may indicate or report its downlink processing delay to the network node 110 in, for example, some or each ARQ feedback message or more infrequently using higher-layer signaling, such as, e.g. RRC or MAC signaling.

For example, when the indication of the determined downlink processing delay of the wireless device 121 is transmitted using higher-layer signalling, e.g. RRC or MAC signaling, this may be performed either at the time when the wireless device 121 is configured or thereafter, such as, e.g. during the duration of the transmission of the DL data which the ARQ feedback information belongs to.

Furthermore, in the indication of the determined downlink processing delay, the determined downlink processing delay may be indicated by one or more of: an absolute subframe number in relation to a subframe number of the reception of the downlink transmissions, an offset time value in relation to the transmission time of the ARQ information, and a difference value indicating the difference between the determined downlink processing delay and at least one previously determined downlink processing delay. This means that one way in which the wireless device 121 may include the ARQ feedback information in the ARQ feedback message is to include the absolute subframe number of the DL transmission receptions for which ARQ processes are reported by the wireless device 121. For example, this may be the subframe n+g−k as shown in the example depicted in FIG. 2. Also, another way in which the wireless device 121 may include the ARQ feedback information in the ARQ feedback message is to include the actual value of the downlink processing delay. This may then be interpreted by the network node 110 as being an offset time relative to, for example, the transmission time of the ARQ feedback message. For example, referring to the example depicted in FIG. 2, this may comprise including the value k in the ARQ feedback message, which may be interpreted as being an offset time relative to the transmission time of the ARQ feedback message, i.e. n+g.

Further, a third way in which the wireless device 121 may include the ARQ feedback information in the ARQ feedback message is to include a difference value that relates to an earlier provided value of the downlink processing delay. This has an advantage in that when there is no change in the downlink processing delay, then no difference value needs to be provided by the wireless device 121. However, it should be noted that caution may be taken so as not to provide difference values that relates to earlier provided difference values, since this may cause the network node 110 and wireless device 121 to understand downlink processing delay differently. This may, for example, be performed by having the reference value, to which the difference value is related to, to be a nominal value of the downlink processing delay. This may, for example, be communicated to the network node 110 either at regular or irregular intervals in ARQ feedback message or via higher-layer signaling, e.g. RRC or MAC signaling.

Further, in some embodiments, the indication of the determined downlink processing delay may be transmitted by the wireless device 121 in a next subsequent subframe after the processing of the downlink transmission has been performed. This means that the wireless device 121 will report the ARQ feedback information in an ARQ feedback message as soon as possible, i.e. in the first possible subframe after decoding of the DL transmission and assembly of the ARQ message. In this case, the network node 110 may advantageously use the determined downlink processing delay to minimize the ARQ feedback delay, i.e. reduce the ARQ feedback delay as much as possible.

Optionally, the indication of the determined downlink processing delay may be transmitted by the wireless device 121 in a subsequent subframe scheduled for the transmission of the ARQ feedback information by the network node 110. This means that the wireless device 121 may report the ARQ feedback information in a set subframe after decoding of the DL transmission and assembly of the ARQ message. In some embodiments, the ARQ feedback information may also be comprised in an ARQ feedback message in the subsequent subframe.

Figure 5:
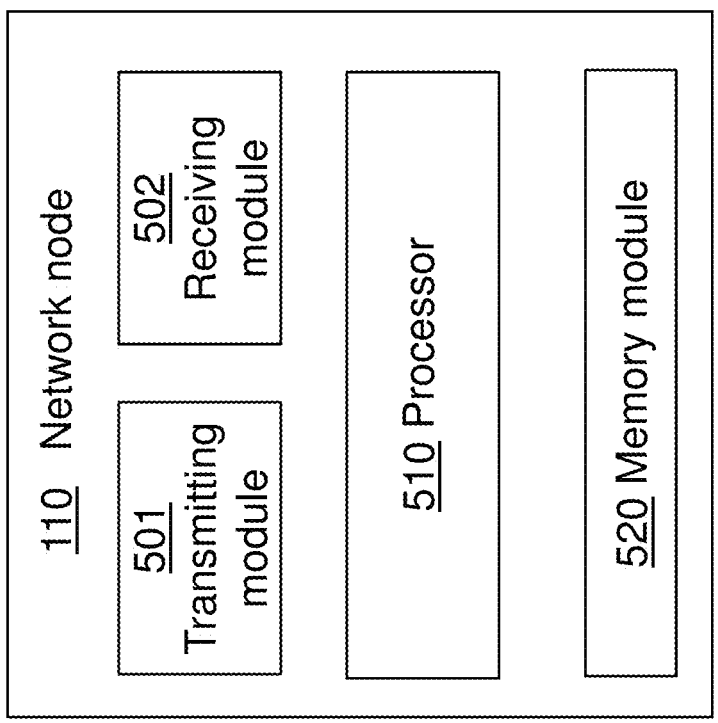
FIG. 5 is a schematic block diagram depicting embodiments of a network node.

To perform the method actions in a wireless communications network 100 for handling ARQ feedback information from a wireless device 121 relating to downlink transmissions from the network node 110, the network node 110 may comprise the following arrangement depicted in FIG. 5.

FIG. 5 shows a schematic block diagram of embodiments of the network node 110. In some embodiments, the network node 110 may comprise a transmitting module 501, a receiving module 502, and a processor 510. The transmitting module 501 may also be referred to as transmitter or transmitting unit, while the receiving module 502 may also be referred to as a receiver or receiving unit. The processor 510 may also be referred to as processing module, processing unit or processing circuitry, and may control the transmitting module 501 and the receiving module 502. Optionally, the processor 510 may be said to comprise one or more of the transmitting module 501 and the receiving module 502, and/or perform the function thereof as described below.

The processor 510 is configured to obtain an indication of a downlink processing delay for the ARQ feedback information from the wireless device 121. In some embodiments, the receiving module 502 may be configured to receive the indication of the downlink processing delay in one of: an ARQ feedback message, a RRC signaling message, or a MAC signaling message. Alternatively, in some embodiments, the processor 510 may be configured to determine the indication of the downlink processing delay based on information indicating the processing capability of the wireless device 121.

The processor 510 is also configured to consider the ARQ feedback information relating to a downlink transmission from the wireless device 121 to be invalid when, according to the obtained indication of a downlink processing delay, the downlink transmission has not been processed by the wireless device 121. In some embodiments, the processor 510 may also be configured to determine an expected time to receive ARQ feedback information from the wireless device 121 at least partly based on the indication of the downlink processing delay. Furthermore, in some embodiments, the processor 510 may also be configured to schedule uplink transmissions of the wireless device 121 to match an expected time to receive ARQ feedback information from the wireless device 121 at least partly based on the indication of the downlink processing delay.

In some embodiments, the transmitting module 501 may be configured to transmit a request for retransmission of the ARQ feedback information that is considered invalid.

The embodiments for handling ARQ feedback information from a wireless device 121 relating to downlink transmissions from the network node 110 may be implemented through one or more processors, such as, e.g. the processor 510 in the network node 110 depicted in FIG. 5, together with computer program code for performing the functions and actions of the embodiments herein. The program code mentioned above may also be provided as a computer program product, for instance in the form of a data carrier carrying computer program code or code means for performing the embodiments herein when being loaded into the processor 510 in the network node 110. The computer program code may e.g. be provided as pure program code in the network node 110 or on a server and downloaded to the network node 110. The carrier may be one of an electronic signal, optical signal, radio signal, or computer-readable storage medium, such as, e.g. electronic memories like a RAM, a ROM, a Flash memory, a magnetic tape, a CD-ROM, a DVD, a Blueray disc, etc.

The network node 110 may further comprise a memory 520, which may be referred to or comprise one or more memory modules or units. The memory 520 may be arranged to be used to store executable instructions and data to perform the methods described herein when being executed in or by the processor 510 of the network node 110. Those skilled in the art will also appreciate that the processor 510 and the memory 520 described above may refer to a combination of analog and digital circuits, and/or one or more processors configured with software and/or firmware, e.g. stored in the memory 520, that when executed by the one or more processors, such as, the processor 510, cause the one or more processors to perform the method as described above. The processor 510 and the memory 520 may also be referred to as processing means. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

From the above it may be seen that some embodiments may comprise a computer program product, comprising instructions which, when executed on at least one processor, e.g. the processor 510, cause the at least one processor to carry out the method for handling ARQ feedback information from a wireless device 121 relating to downlink transmissions from the network node 110. Also, some embodiments may further comprise a carrier containing said computer program product, wherein the carrier is one of an electronic signal, optical signal, radio signal, or computer-readable storage medium.

Figure 6:
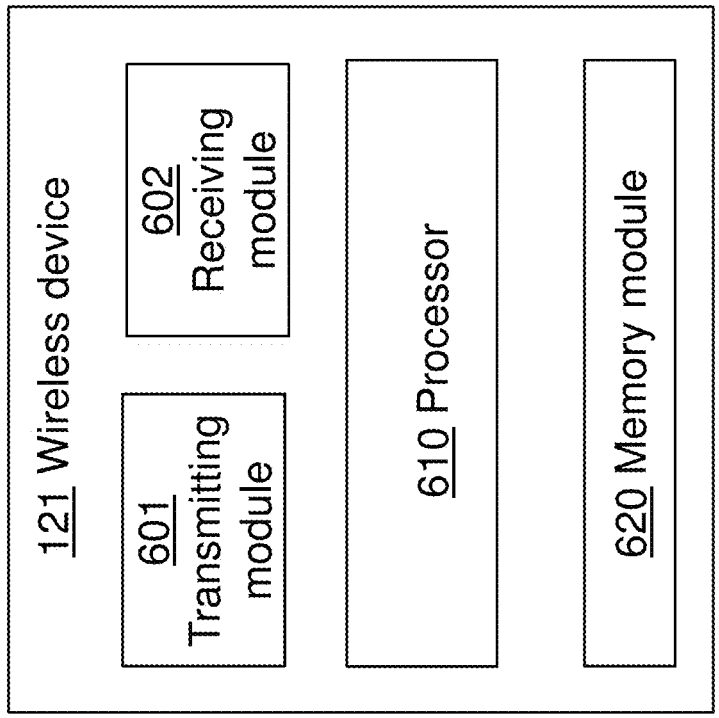
FIG. 6 is a schematic block diagram depicting embodiments of a wireless device.

To perform the method actions in the wireless device 121 for enabling a network node 110 in a wireless communications network 100 to handle ARQ feedback information from the wireless device 121 relating to downlink transmissions from the network node 110, the wireless device 121 may comprise the following arrangement depicted in FIG. 6.

FIG. 6 shows a schematic block diagram of embodiments of the wireless device 121. In some embodiments, the wireless device 121 comprises a transmitting module 601 and a processor 610. The wireless device 121 may also comprise a receiving module 602 for, for example, receiving downlink transmissions from the network node 110. The transmitting module 601 may also be referred to as transmitter or transmitting unit, while the receiving module 602 may also be referred to as a receiver or receiving unit. The processor 610 may also be referred to as processing module, processing unit or processing circuitry, and may control the transmitting module 601 and the receiving module 602. Optionally, the processor 610 may be said to comprise one or more of the transmitting module 601 and the receiving module 602, and/or perform the function thereof as described below.

The processor 610 is configured to determine a downlink processing delay for the ARQ feedback information.

In some embodiments, the processor 610 may be further configured to determine the downlink processing delay by a predetermined value in the wireless device 121 and/or a value from a set of predetermined values in the wireless device 121. Alternatively, the processor 610 may be further configured to determine the downlink processing delay based on at least one time period between a determination of ARQ feedback information relating to a downlink transmission and the transmission of the determined ARQ feedback information to the network node 110 from the wireless device 121. In this case, according to some embodiments, the processor 610 may be further configured to determine the downlink processing delay based on more than one such time period. According to another alternative, the processor 610 may, in some embodiments, be further configured to determine the downlink processing delay based on a configurable amount of resources in the wireless device 121 dedicated for downlink processing.

The transmitter 601 is configured to transmit an indication of the determined ownlink processing delay to the network node 110.

In some embodiments, the transmitter 601 may be configured to transmit the indication of the determined downlink processing delay in one of: an ARQ feedback message, a RRC signaling message, or a MAC signaling message. In some embodiments, when the indication of the determined downlink processing delay is transmitted in an ARQ feedback message, the transmitter 601 may indicate the determined downlink processing delay is indicated by one or more of: a subframe number in relation to a subframe number of the reception of the downlink transmissions, an offset time value in relation to the transmission time of the ARQ information, and a difference value indicating the difference between the determined downlink processing delay and at least one previously determined downlink processing delay.

In some embodiments, the transmitter 601 may be configured to transmit the indication of the determined downlink processing delay in a next subsequent subframe after the processing of the downlink transmission has been performed. Optionally, the transmitter 601 may be configured to transmit the indication of the determined downlink processing delay in a subsequent subframe scheduled for the transmission of the ARQ feedback information by the network node 110.

The embodiments enabling a network node 110 in a wireless communications network 100 to handle ARQ feedback information from the wireless device 121 relating to downlink transmissions from the network node 110 may be implemented through one or more processors, such as, e.g. the processor 610 in the wireless device 121 depicted in FIG. 6, together with computer program code for performing the functions and actions of the embodiments herein. The program code mentioned above may also be provided as a computer program product, for instance in the form of a data carrier carrying computer program code or code means for performing the embodiments herein when being loaded into the processor 610 in the wireless device 121. The computer program code may e.g. be provided as pure program code in the wireless device 121 or on a server and downloaded to the wireless device 121. The carrier may be one of an electronic signal, optical signal, radio signal, or computer-readable storage medium, such as, e.g. electronic memories like a RAM, a ROM, a Flash memory, a magnetic tape, a CD-ROM, a DVD, a Blue-ray disc, etc.

The wireless device 121 may further comprise a memory 620, which may be referred to or comprise one or more memory modules or units. The memory 620 may be rranged to be used to store executable instructions and data to perform the methods described herein when being executed in the processor 610 of the wireless device 121. Those skilled in the art will also appreciate that the processor 610 and the memory 620 described above may refer to a combination of analog and digital circuits, and/or one or more processors configured with software and/or firmware, e.g. stored in the memory 620, that when executed by the one or more processors, such as, the processor 610, cause the one or more processors to perform the method as described above. The processor 610 and the memory 620 may also be referred to as processing means. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

From the above it may be seen that some embodiments may comprise a computer program product, comprising instructions which, when executed on at least one processor, e.g. the processor 610, cause the at least one processor to carry out the method for enabling a network node 110 in a wireless communications network 100 to handle ARQ feedback information from the wireless device 121 relating to downlink transmissions from the network node 110. Also, some embodiments may further comprise a carrier containing said computer program product, wherein the carrier is one of an electronic signal, optical signal, radio signal, or computer-readable storage medium.

The terminology used in the detailed description of the particular embodiments illustrated in the accompanying drawings is not intended to be limiting of the described methods, the network node 110 and the wireless device 121, which instead should be construed in view of the enclosed claims.

As used herein, the term "and/or" comprises any and all combinations of one or more of the associated listed items.

Further, as used herein, the common abbreviation "e.g.", which derives from the Latin phrase "exempli gratia," may be used to introduce or specify a general example or examples of a previously mentioned item, and is not intended to be limiting of such item. If used herein, the common abbreviation "i.e.", which derives from the Latin phrase "id est," may be used to specify a particular item from a more general recitation. The common abbreviation "etc.", which derives from the Latin expression "et cetera" meaning "and other things" or "and so on" may have been used herein to indicate that further features, similar to the ones that have just been enumerated, exist.

As used herein, the singular forms "a", "an" and "the" are intended to comprise also the plural forms as well, unless expressly stated otherwise. It will be further understood that the terms "includes," "comprises," "including" and/or "comprising," when used in this specification, specify the presence of stated features, actions, integers, steps, operations, elements, and/or components, but do not preclude the presence or addition of one or more other features, actions, integers, steps, operations, elements, components, and/or groups thereof.

Unless otherwise defined, all terms comprising technical and scientific terms used herein have the same meaning as commonly understood by one of ordinary skill in the art to which the described embodiments belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The embodiments herein are not limited to the above described preferred embodiments. Various alternatives, modifications and equivalents may be used. Therefore, the above embodiments should not be construed as limiting.

ABBREVIATIONS

3GPP Third Generation Partnership Program
ACK Acknowledgement
ARQ Automatic Repeat re-Quest
DCI Downlink Control Information
DL Downlink
DTX Discontinuous Transmission
FDD Frequency-Division Duplex
HARQ Hybrid ARQ
LA Link Adaptation
LTE Long-Term Evolution
MAC Medium-Access Control
MSN Message Sequence Number
MTC Machine-Type Communication
NACK or NAK Negative Acknowledgement
NDI New Data Indicator
NW Network
PDSCH Physical Downlink Shared Channel
PUCCH Physical Uplink Common Control Channel
PUSCH Physical Uplink Shared Channel
RRC Radio-Resource Control
RV Redundancy Version
RX Receive
TDD Time-Division Duplex
TTI Transmission-Time Interval
UE User Equipment
UL Uplink

The invention claimed is:

1. A method performed by a network node in a wireless communications network for handling Automatic Repeat reQuest, ARQ, feedback information from a wireless device relating to downlink transmissions from the network node, the method comprising:
  obtaining an indication of a downlink processing delay for the ARQ feedback information from the wireless device; and
  considering the ARQ feedback information relating to a downlink transmission from the wireless device to be invalid when, according to the obtained indication of a downlink processing delay, the downlink transmission has not been processed by the wireless device.

2. The method according to claim 1, further comprising: transmitting a request for retransmission of the ARQ feedback information that is considered invalid.

3. The method according to claim 1, wherein the indication of the downlink processing delay is received in one of: an ARQ feedback message, a Radio-Resource Control, RRC, signaling message, or a Medium-Access Control, MAC, signaling message.

4. The method according to claim 1, wherein the indication of the downlink processing delay is determined by the network node based on information indicating the processing capability of the wireless device.

5. The method according to claim 1, further comprising determining an expected time to receive ARQ feedback information from the wireless device at least partly based on the indication of the downlink processing delay.

6. The method according to claim 1, further comprising scheduling uplink transmissions of the wireless device to match an expected time to receive ARQ feedback information from the wireless device at least partly based on the indication of the downlink processing delay.

7. A network node in a wireless communications network for handling Automatic Repeat reQuest, ARQ, feedback information from a wireless device relating to downlink transmissions from the network node, the network node comprising:
  a processor configured to obtain an indication of a downlink processing delay for the ARQ feedback information from the wireless device, and to consider the ARQ feedback information relating to a downlink transmission from the wireless device to be invalid when, according to the obtained indication of a downlink processing delay, the downlink transmission has not been processed by the wireless device.

8. The network node according to claim 7, further comprising a transmitter configured to transmit a request for retransmission of the ARQ feedback information that is considered invalid.

9. The network node according to claim 7, further comprising a receiver configured to receive the indication of the downlink processing delay in an ARQ feedback message, a Radio-Resource Control, RRC, signaling message, or a Medium-Access Control, MAC, signaling message.

10. The network node according to claim 7, wherein the processor is further configured to determine the indication of the downlink processing delay based on information indicating the processing capability of the wireless device.

11. The network node according to claim 7, wherein the processor is further configured to determine an expected time to receive ARQ feedback information from the wireless device at least partly based on the indication of the downlink processing delay.

12. The network node according to claim 7, wherein the processor is further configured to schedule uplink transmissions of the wireless device to match an expected time to receive ARQ feedback information from the wireless device at least partly based on the indication of the downlink processing delay.

13. The network node according to claim 7, further comprising a memory that contains instructions executable by said processor, and wherein said instructions at least partly configure the processor to obtain the indication of the downlink processing delay and for considering given ARQ feedback information from the wireless device to be invalid, based on the obtained indication of the downlink processing delay.

* * * * *